(12) United States Patent
Qi et al.

(10) Patent No.: US 10,214,113 B2
(45) Date of Patent: Feb. 26, 2019

(54) FULLY-AUTOMATIC DUST PROOF SYSTEM FOR QUICK CHANGE CONNECTOR OF ELECTRIC VEHICLE

(71) Applicant: NIO CO., LTD., Shanghai (CN)

(72) Inventors: Hui Qi, Shanghai (CN); Bo Li, Shanghai (CN); Yaping Jiang, Shanghai (CN); Jie Fang, Shanghai (CN); Xiaojia Deng, Richmond Hill (CA)

(73) Assignee: NIO CO., LTD., Shanghai (CN)

( * ) Notice: Subject to any disclaimer, the term of this patent is extended or adjusted under 35 U.S.C. 154(b) by 0 days.

(21) Appl. No.: 15/861,904

(22) Filed: Jan. 4, 2018

(65) Prior Publication Data

US 2018/0186243 A1    Jul. 5, 2018

(30) Foreign Application Priority Data

Jan. 4, 2017    (CN) .......................... 2017 1 0004626

(51) Int. Cl.
*H01R 13/44*   (2006.01)
*B60L 11/18*   (2006.01)
*B60S 5/06*    (2019.01)
*H01R 13/52*   (2006.01)
*H01R 13/66*   (2006.01)
(Continued)

(52) U.S. Cl.
CPC ............ *B60L 11/1822* (2013.01); *B60K 1/04* (2013.01); *B60S 5/06* (2013.01); *H01R 13/5213* (2013.01); *H01R 13/6675* (2013.01); *H01R 13/6683* (2013.01); *B60L 2230/10* (2013.01);
(Continued)

(58) Field of Classification Search
None
See application file for complete search history.

(56) References Cited

U.S. PATENT DOCUMENTS 8,425,243 B2 *   4/2013   Alvarez Rivera ... H01R 13/447
                                                           439/142
9,033,718 B2 *   5/2015   Munehiro .......... H01R 13/5213
                                                           439/136
(Continued)

FOREIGN PATENT DOCUMENTS

CN      104466516      3/2015
CN      104859415      8/2015
(Continued)

OTHER PUBLICATIONS

International Search Report for International (PCT) Patent Application No. PCT/CN2017/095134, dated Nov. 2, 2017, 5 pages.

*Primary Examiner* — Tho D Ta
(74) *Attorney, Agent, or Firm* — Sheridan Ross P.C.

(57) ABSTRACT

A fully-automatic dust proof system for quick change connector of electric vehicle is provided. The fully-automatic dust proof system of the application comprises: a base provided at the quick change connector of the battery pack; a dust proof covering plate slidably installed onto the base; an electric motor fixed on the base; a power supply electrically connected with the electric motor; a control system for controlling the motor to drive the dust proof covering plate to slide; a distance sensor for monitoring relative distance between the battery pack and the electric vehicle; and a pressure sensor for monitoring whether the dust proof covering plate is in place or not.

9 Claims, 3 Drawing Sheets

(51) Int. Cl.
*B60K 1/04* (2019.01)
*H01R 13/447* (2006.01)
*H01R 13/453* (2006.01)

(52) U.S. Cl.
CPC ........ *H01R 13/447* (2013.01); *H01R 13/4534* (2013.01); *H01R 2201/26* (2013.01)

(56) References Cited

U.S. PATENT DOCUMENTS

| | | | |
|---|---|---|---|
| 9,071,020 B2 * | 6/2015 | Temmesfeld | B60L 11/1818 |
| 2014/0140558 A1 * | 5/2014 | Kwong | H04R 3/007 |
| | | | 381/345 |
| 2015/0340795 A1 * | 11/2015 | Lee | G06F 1/1656 |
| | | | 381/334 |

FOREIGN PATENT DOCUMENTS

| | | |
|---|---|---|
| JP | S63-178702 | 7/1988 |
| JP | H06-199137 | 7/1994 |
| JP | 2002-120995 | 4/2002 |

* cited by examiner

FULLY-AUTOMATIC DUST PROOF SYSTEM FOR QUICK CHANGE CONNECTOR OF ELECTRIC VEHICLE

CROSS-REFERENCE TO RELATED APPLICATIONS

This application claims the benefit of China Patent Application No. 201710004626.3 filed Jan. 4, 2017, the contents of which are incorporated herein by reference.

TECHNICAL FIELD

The present application relates to battery swap of electric vehicles, particularly to a fully-automatic dust proof system for quick change connector of electric vehicle.

BACKGROUND

With development of new energy vehicle, especially electric-only vehicle technology, two ways to provide electric energy for electric vehicles are getting popular. Particularly, one way is to directly recharge a vehicle, which takes long time; the other is to swap the battery of a vehicle, that is to say, detach the depleted battery pack and attached a fully charged battery pack, achieving the purpose of fast energy replenish.

With regard to the second way, however, quick change connectors, as electric interfaces, are required to connect the battery pack to the vehicle body. Since the back pack is not always assembled on the vehicle body in the latter way of providing electric energy, the quick change connector is prone to being exposed to external contaminants or dust during its storage and transportation and thus deteriorates. For example, the contact resistance of the power supply connector is getting bigger, or the liquid cooling joint is clogged, even the male and female parts of the quick change connector become mismatching, negatively influencing normal operation of the back pack and the electric vehicle.

Accordingly, there is a need in the art for a sealing device for quick change connector of battery pack, which can solve the previously mentioned problems.

SUMMARY

To solve the above described problems in the prior art, i.e., to solve the problem that quick change connector is prone to being clogged by contaminants during long time exposure to outside when the battery is transported and stored, the application provides a fully-automatic dust proof system for quick change connector of electric vehicle, comprising: a base provided at quick change connector of a battery pack; a dust proof covering plate slidably installed onto the base to close or expose the quick change connector; an electric motor fixed on the base, for driving the dust proof covering plate to slide; and a power supply for supplying power to the electric motor.

In a preferable embodiment of the fully-automatic dust proof system, the fully-automatic dust proof system also includes a control system electrically connected with the power supply and the electric motor respectively, and the control system is used to control the motor to drive the dust proof covering plate, which therefore slides to close or expose the quick change connector.

In a preferable embodiment of the fully-automatic dust proof system, the base is provided with a first sensor, which is electrically connected with the control system and used for monitoring distance between the battery pack and the electric vehicle body.

In a preferable embodiment of the fully-automatic dust proof system, the base is provided with a second sensor, which is in electric connection with the control system and when the dust proof covering plate is completely closed or opened, the second sensor sends an in-position signal to the control system.

In a preferable embodiment of the fully-automatic dust proof system, the second sensor is a pressure sensor or a distance sensor.

In a preferable embodiment of the fully-automatic dust proof system, the dust proof covering plate is provided with a rack, and output shaft of the electric motor is provided with a gear, the rack and the gear intermesh with one another.

In a preferable embodiment of the fully-automatic dust proof system, the dust proof covering plate is provided with a boss, which is in contact with the pressure sensor when the dust proof covering plate slides to the end of the base.

In a preferable embodiment of the fully-automatic dust proof system, the base is provided with two pressure sensors provided respectively at two sliding ends of the boss.

In a preferable embodiment of the fully-automatic dust proof system, the fully-automatic dust proof system includes two electric motors symmetrically provided at two sides of the base in sliding direction of the dust proof covering plate.

In a preferable embodiment of the fully-automatic dust proof system, the control system includes a central controller as well as a distance sensor module, a motor control system and a pressure sensor module in electric connection respectively with the central controller.

It can be understood by those skilled in the art that in the preferred technical solutions of the application, by providing the base at the quick change connector of the battery pack and installing on the base the dust proof covering plate, the distance sensor, the pressure sensor and the electric motor driving the dust proof covering plate, the control system enables the motor to drive the covering plate which slides to automatically seal the quick change connector as the battery pack leaves the electric vehicle body, and the pressure sensor feed backs the information indicative of the covering plate being in place to the control system, in order that the electric motor is stopped from rotating; when the battery pack is to be assembled onto the electric vehicle body, the control system enables the motor to drive the covering plate which thus automatically opens, and the pressure sensor feed backs the information indicative of the covering plate being fully opened to the control system which stops the motor from rotating. Consequently, the fully-automatic dust proof system of the application can effectively avoid the quick change connector being clogged by contaminants due to long-time exposure to external environment.

DETAILED DESCRIPTION

Figure 1:
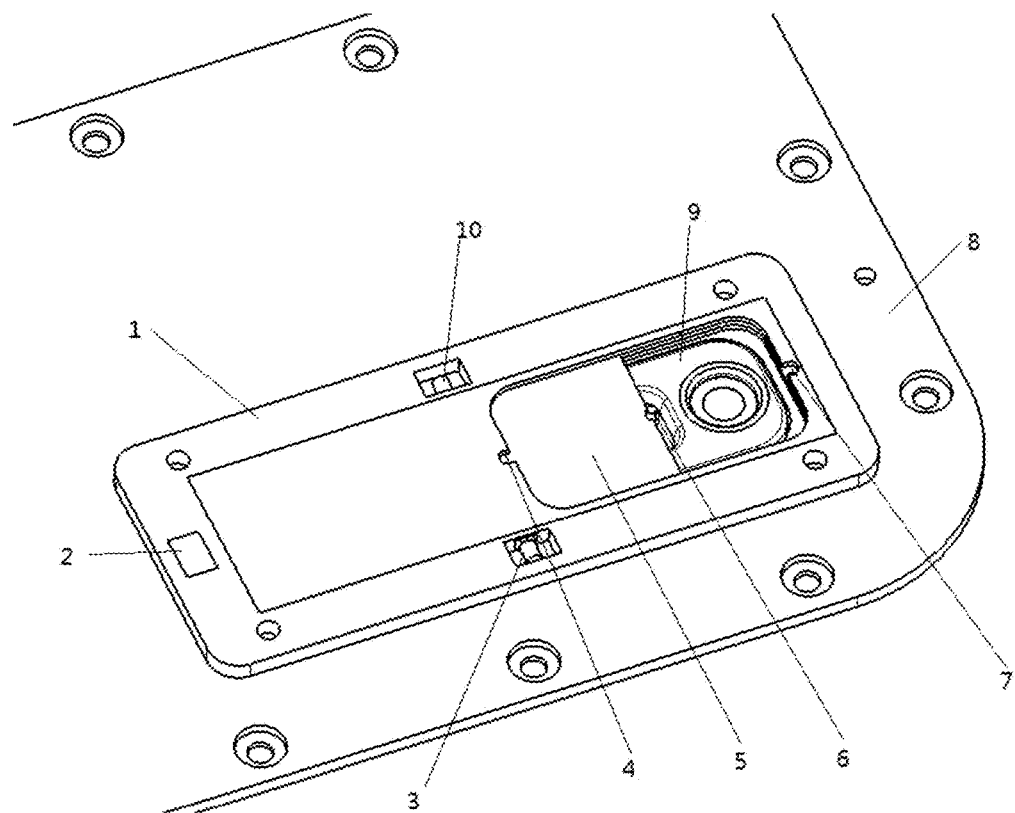
FIG. 1 is a schematic illustration of the fully-automatic dust proof system for quick change connector of electric vehicle of the application.

The preferred embodiments of the application are described below with reference to the accompanying figures. As will be understood by those skilled in the art, these embodiments are simply for interpreting the technical principle of the application and are not intended to limit its protection scope in any way. For example, although each member in the figures is drawn to scale, this proportional relation is merely exemplary in nature and can be modified as desired to accommodate specific applications by skilled artisans.

It is to be pointed out that in the description of the application, the usage of such directional and positional terms as central, upper, lower, left, right, vertical, horizontal, inner and outer, on the basis of the directional and positional relations shown in the drawings, is to facilitate the description and does not express or imply the necessary specific positions or specific operational and structural positions of the devices or elements of the disclosure. Therefore, the usage is not to be understood as limitation on the application. Additionally, such terms as first, second and third are merely provided for the purposes of description other than expressing or implying their relative importance.

Moreover, it should also be noted that in the description of the application, unless otherwise unambiguously specified and defined, the terms of install, connect and couple should be construed in their broad senses, which can be understood as permanent or detachable or integrally connecting, mechanically or electrically connecting, directly connecting or indirectly connecting via a third part, or even connecting between the inner parts of two elements. It will be understood by those skilled in the art that the specific meanings of the above mentioned terms can be construed based on specific contexts.

As shown in FIG. 1, a fully-automatic dust proof system for quick change connector of electric vehicle of the application comprises a base 1, a distance sensor 2, a first electric motor 3, a first pressure sensor 4, a dust proof covering plate 5, a boss 6, a second pressure sensor 7 and a second electric motor 10. It should be pointed out that the distance sensor 2 is the first sensor described in the claims, and the first pressure sensor 4 and the second pressure 7 are the second sensors described in the claims. The base 1 is in permanent connection with an upper covering plate 8 of the battery pack preferably by bolting; or other ways of connecting, such as welding or snapping, etc., can be employed by those skilled in the art to make the base 1 and the upper covering plate 8 of the battery pack permanently connected together. When the base 1 is mounted in position, the quick change connector on the upper covering plate 8 is surrounded by the base 1.

With continued reference to FIG. 1, there are two U-shaped grooves (not shown in the figure) provided on the base 1, which are used for installing the first and second pressure sensors 4 and 7. An installment position (not shown in the figure) is provided on the left side of the base 1 as shown in FIG. 1 to mount the distance sensor 2. Also provided on the base 1 is a sliding groove (not shown in the figure), which enables the dust proof covering plate 5 to be slidably installed to the base 1 and the first and second electric motors 3 and 10 to be symmetrically installed to two sides of the base 1 in the sliding direction of the dust proof covering plate 5. Preferably, the first electric motor 3 and the second electric motor 10 are micro electric motors to save installation space.

Figure 2:
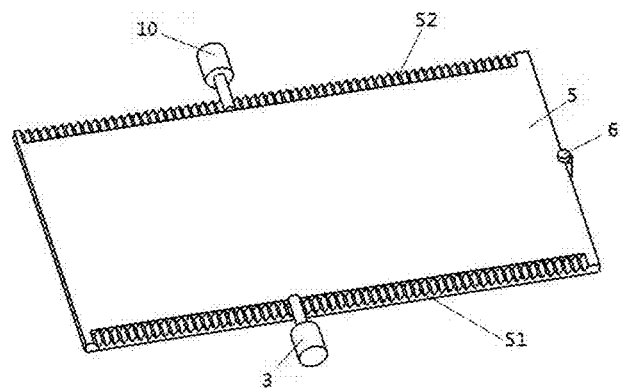
FIG. 2 is a schematic illustration of the dust proof covering plate intermeshing with the electric motor of the application.

As shown in FIGS. 1 and 2, according to the direction shown in FIG. 2, the dust proof covering plate 5 is provided with a first rack 51 and a second rack 52 respectively at its upper side and lower side, and two gears (not shown in the figures) intermeshing respectively with the first and second rack 51 and 52 are provided respectively on the output shafts of the first electric motor 3 and the second electric motor 10, such that the first electric motor 3 and the second electric motor 10 can drive the dust proof covering plate 5 respectively through rack-and-gear to slide. As can be understood by those skilled in the art that it is possible to provide only one of the first electric motor 3 and the second electric motor 10. Likewise, it is also possible to provide three or more electric motors to drive dust proof plate 5. It can also be understood by the skilled artisan that other driving ways rather than rack-and-gear such as screw nut, can be employed by the electric motors 3 and 10 to drive the dust proof covering plate 5.

As shown in FIG. 2, the boss 6 and the right end of the dust proof covering plate 5 (the right end of the dust proof covering plate 5 in the FIG. 2) are permanently connected preferably by welding. When the electric motors 3 and 10 drive the dust proof covering plate 5 to completely open or close, there might be a collision between the boss 6 and the first pressure sensor 4 or the second pressure sensor 7, so as to detect whether the dust proof covering plate 5 is in place or not. Preferably, the boss 6 is in the shape of a cylinder, or in other shapes as can be envisaged by those skilled in the art according to the actual situation. It can be understood by the skilled person that the first and second pressure sensors 4 and 7 may collide with the two ends of the dust proof covering plate 5 by varying their installment positions, thereby omitting the boss 6. As can also be understood by those skilled in the art that the first and second pressure sensors 4 and 7 may be replaced respectively by proximity switches, the electric motors 3 and 10 stop rotating as the boss 6 approaches the proximity switches and rotate as the boss 6 moves away from the proximity switches; the first and second pressure sensors 4 and 7 can also be replaced respectively by distance sensors, the operation of the electric motors 3 and 10 is controlled by monitoring the distance between the boss 6 and the distance sensors.

Figure 3:
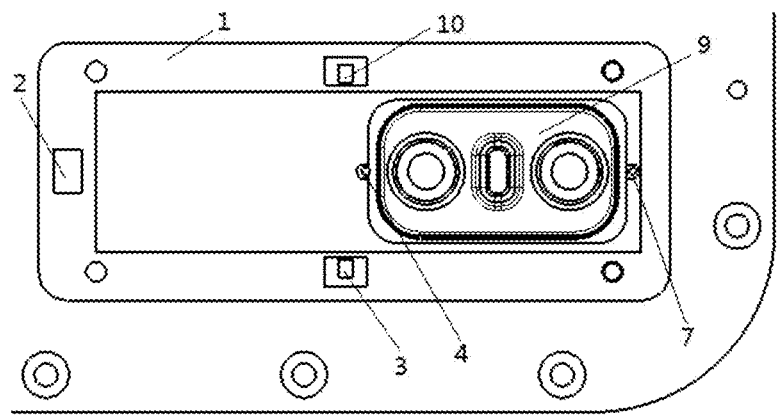
FIG. 3 is a schematic illustration of the fully-automatic dust proof system for quick change connector of electric vehicle of the application with its dust proof covering plate opened.

With reference to FIG. 3, the fully-automatic dust proof system for quick change connector of electric vehicle of the application with the dust proof covering plate 5 opened is shown. For the sake of clarity, the dust proof covering plate 5 is omitted in FIG. 3.

Figure 4:
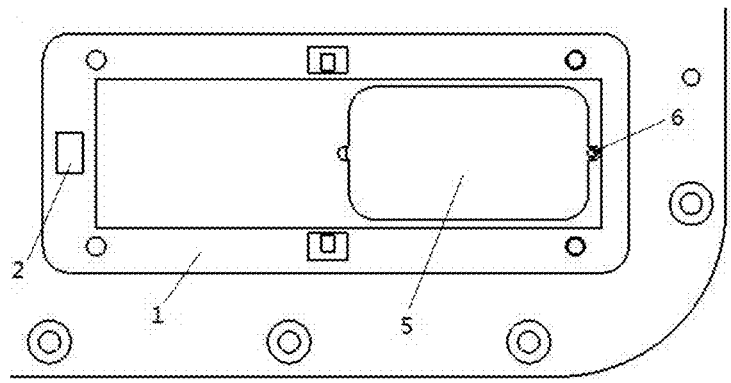
FIG. 4 is a schematic illustration of the fully-automatic dust proof system for quick change connector of electric vehicle of the application with its dust proof covering plate closed.

With reference to FIG. 4, the fully-automatic dust proof system for quick change connector of electric vehicle of the application with the dust proof covering plate 5 closed is shown.

Figure 5:
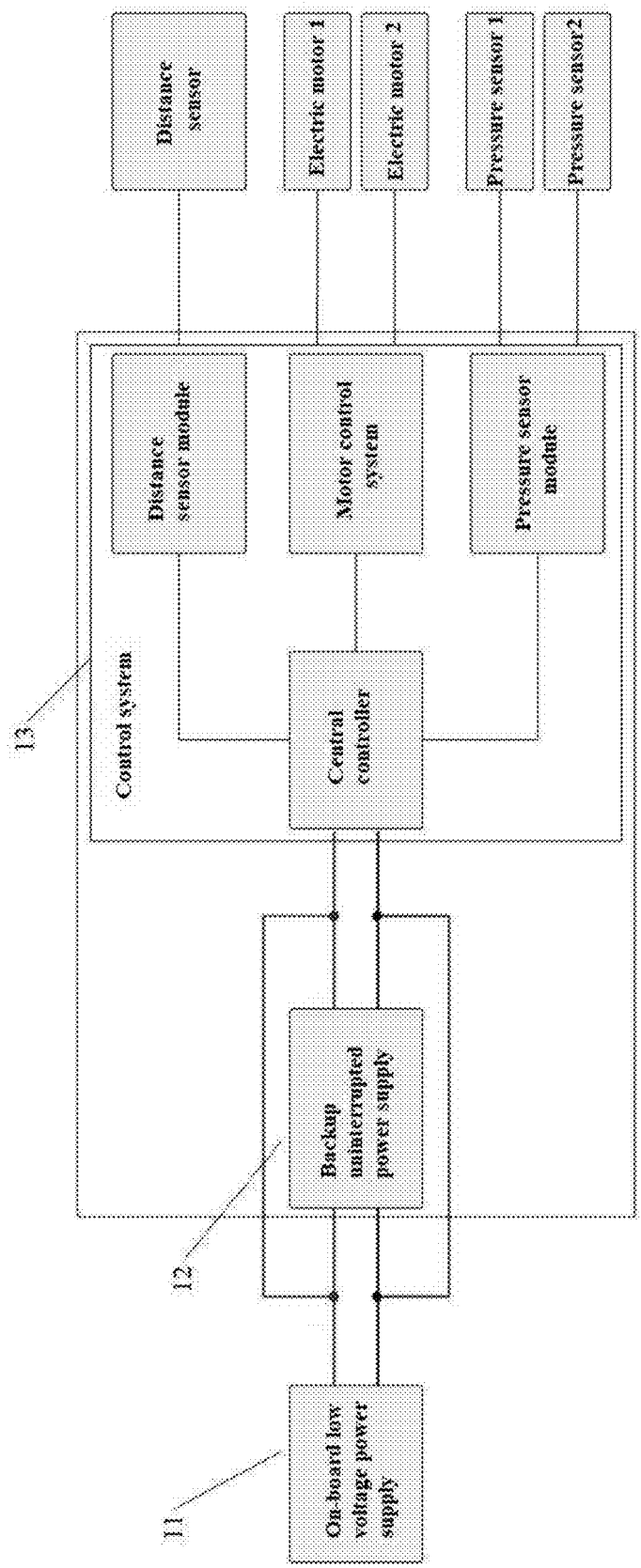
FIG. 5 is a logical control schematic diagram of the fully-automatic dust proof system for quick change connector of electric vehicle of the application.

As shown in FIG. 5, the fully-automatic dust proof system for quick change connector of electric vehicle of the application also includes a backup uninterrupted power supply 12 and a control system 13. The control system 13 includes a central controller, a distance sensor module, an electric motor control system and a pressure sensor module. The backup uninterrupted power supply 12 is connected with the central controller, which is connected respectively with the distance sensor module, the electric motor control system and the pressure sensor module. The distance sensor module is electrically connected to the distance sensor 2 (the distance sensor shown in FIG. 5), and the electric motor control system is connected respectively with the first electric motor 3 (the electric motor 1 shown in FIG. 5) and the second electric motor 10 (the electric motor 2 shown in FIG. 5). Also, the pressure sensor module is electrically connected respectively with the first pressure sensor 4 (the pressure sensor shown in FIG. 5) and the second pressure sensor 7 (the pressure sensor 2 shown in FIG. 5). It is to be understood by those skilled person in the art that the control system and the central controller can be realized in the form of any suitable hardware or software like combinational logic controller and programmable logic controller, and so on, so long as the object of controlling other components or device in the application can be achieved.

When a battery is assembled onto an electric vehicle, the backup uninterrupted power supply 12 is electrically connected with and charged by an on-board low voltage power supply 11, which can also be directly in electric connection with the central controller with the uninterrupted power supply 12 being short-connected.

The switch and controlling principle of the fully-automatic dust proof system of the application is briefed below in connection FIG. 1-5.

As the battery pack is dismounted from the electric vehicle body, the fully-automatic dust proof system is disconnected from the on-board low voltage power supply 11 and thus powered by the backup uninterrupted power supply 12. During the process of battery pack leaving the electric vehicle, the distance sensor 2 monitors the distance between the upper covering plate 8 of the battery pack and the electric vehicle body in real time and sends the information related to the distance to the distance sensor module. When the distance is longer than 50 cm, the distance sensor module will send a signal to the central controller, which then controls the electric motor control system to drive the electric motors 3 and 10. The electric motors 3 and 10 in turn drive the dust proof covering plate 5 to slide. When the boss 6 collides with the second pressure sensor 7, the second pressure sensor 7 sends to the pressure sensor module a signal, which is then sent to the central controller. The central controller controls the electric motor control system so that the electric motors 3 and 10 are stopped from rotating. At this time, the dust proof covering plate 5 is completely closed, and the quick change connector is sealed.

As the battery pack is installed onto the electric vehicle, the distance sensor 2 sends the information about the sensed distance to the distance sensor module in real time with the battery pack gradually approaching the electric vehicle body. When the distance between the upper covering plate 8 of the battery pack and the electric vehicle body is shorter than 50 cm, the distance sensor module will send a signal to the central controller, which then controls the electric motor control system to drive the electric motors 3 and 10 to rotate. The electric motors 3 and 10 in turn drive the dust proof covering plate 5 to slide. When the boss 6 collides with the first pressure sensor 4, the first pressure sensor 4 sends to the pressure sensor module a signal, which is then sent to the central controller. The central controller controls the electric motor control system so that the electric motors 3 and 10 are stopped from rotating. At this time, the dust proof covering plate 5 is completely opened, and the battery pack can be mounted to the electric vehicle body.

It can be understood by those skilled in the art as the battery pack is dismounted from the electric vehicle body, the order for the electric motors 3 and 10 to drive the dust proof covering plate 5 closing can be sent by other way rather than the distance sensor 2. Specifically, it can be achieved by the central controller which detects the disconnection of the on-board low voltage power supply 11 and the fully-automatic dust proof system. More particularly, the central controller enables the electric motor control system to drive the electric motors 3 and 10 to rotate and drive the dust proof covering plate 5 to close.

As can also be understood by the skilled artisan that when the first and second pressure sensors 4 and 7 emit signals, the distance between the upper covering plate 8 of the battery pack and the electric vehicle body is not constant but variable. Particularly, the distance can be varied by those skilled in the art according to the moving speed of the covering plate 5 driven by the electric motors 3 and 10 and the moving speed of the battery pack approaching the electric vehicle body.

As can be further understood by those skilled in this field that the quick change connector 9 can be a liquid cooling quick change connector or a power quick change connector, or a combination of them.

The technical solutions of the application have been described with reference to the preferred embodiments shown in the accompanying figures. However, as will be appreciated by those skilled in the art that these specific embodiments are not intended to limit the protection scope of the application. Without departing from the principle of the application, various changes may be made and equivalents may be substituted for related technical features, the varied technical solutions will fall within the protection scope of the application.

What is claimed is:

1. A fully-automatic dust proof system for a quick change connector of a battery pack for an electric vehicle, comprising:
 a base provided at the quick change connector of the battery pack for the electric vehicle;
 a dust proof covering plate slidably installed onto the base to close or expose the quick change connector;
 a first electric motor and a second electric motor fixed on the base for driving the dust proof covering plate to slide, wherein the electric motors are symmetrically provided at two sides of the base in a sliding direction of the dust proof covering plate; and
 a power supply for supplying power to the electric motors.

2. The fully-automatic dust proof system according to claim 1, wherein the control system includes a central controller as well as a distance sensor module, a motor control system and a pressure sensor module each of which is electrically connected with the central controller.

3. The fully-automatic dust proof system according to claim 1, further comprising a control system electrically connected with the power supply and the electric motors respectively, and the control system is used to control the motors to drive the dust proof covering plate, thereby closing or exposing the quick change connector.

4. The fully-automatic dust proof system according to claim 3, wherein the base is provided with a first sensor, which is electrically connected with the control system and used for monitoring distance between the battery pack and a body of the electric vehicle.

5. The fully-automatic dust proof system according to claim 4, wherein the base is provided with a second sensor, which is in electric connection with the control system and when the dust proof covering plate is completely closed or opened, the second sensor sends an in-position signal to the control system.

6. The fully-automatic dust proof system according to claim 5, wherein the second sensor is a pressure sensor or a distance sensor.

7. The fully-automatic dust proof system according to claim 6, wherein the dust proof covering plate is provided with a rack, and output shafts of the electric motors are each provided with a gear, the rack and the gears intermesh with one another.

8. The fully-automatic dust proof system according to claim 7, wherein the dust proof covering plate is provided with a boss, which is in contact with the second sensor when the dust proof covering plate slides to an end of the base.

9. The fully-automatic dust proof system according to claim 8, wherein the base is provided with two pressure sensors which are provided respectively at two sliding ends of the boss.

\* \* \* \* \*